(12) United States Patent
Valfridsson

(10) Patent No.: US 10,710,853 B2
(45) Date of Patent: Jul. 14, 2020

(54) FLOOR CONVEYOR

(71) Applicant: Toyota Material Handling Manufacturing Sweden AB, Mjölby (SE)

(72) Inventor: Göran Valfridsson, Mjölby (SE)

(73) Assignee: Toyota Material Handling Manufacturing Sweden AB, Mjölby (SE)

( * ) Notice: Subject to any disclaimer, the term of this patent is extended or adjusted under 35 U.S.C. 154(b) by 0 days.

(21) Appl. No.: 15/650,241

(22) Filed: Jul. 14, 2017

(65) Prior Publication Data

US 2018/0016127 A1 Jan. 18, 2018

(30) Foreign Application Priority Data

Jul. 14, 2016 (EP) ................................ 16179522

(51) Int. Cl.
*B66F 9/07* (2006.01)
*B66F 9/06* (2006.01)
(Continued)

(52) U.S. Cl.
CPC ........ *B66F 9/0755* (2013.01); *B60R 21/0132* (2013.01); *B66F 9/063* (2013.01);
(Continued)

(58) Field of Classification Search
CPC .................................................. B66F 9/0755; B66F 9/07581; B66F 9/07568; B66F 9/063; B66F 17/003;
(Continued)

(56) References Cited

U.S. PATENT DOCUMENTS

| 4,077,486 A | 3/1978 | Blakeslee et al. |
|---|---|---|
| 4,318,451 A | 3/1982 | Liggett |

(Continued)

FOREIGN PATENT DOCUMENTS

| EP | 0237878 A2 | 9/1987 |
|---|---|---|
| EP | 1462880 A2 | 9/2004 |

(Continued)

OTHER PUBLICATIONS

The extended search report from the European Patent Office, dated Jan. 27, 2017, 3 Pages, for European Patent Application No. 16179522.4.

(Continued)

*Primary Examiner* — Rodney A Butler
(74) *Attorney, Agent, or Firm* — Quarles & Brady LLP

(57) ABSTRACT

Systems and methods for operation of a floor conveyor, the floor conveyor including a sensor device, the systems and methods include providing a predetermined detection zone outside at least a section of the circumference of the floor conveyor for detection of foreign objects positioned inside the predetermined detection zone, wherein the predetermined detection zone is arranged to end at a first predetermined distance from a predetermined object. The method further comprises extending the predetermined detection zone with a second predetermined distance within which the predetermined object is expected to be positioned. The method further comprises implementing security measures on the floor conveyor, if the predetermined object is not detected within the extended predetermined detection zone.

20 Claims, 3 Drawing Sheets

(51) Int. Cl.
*B60R 21/01* (2006.01)
*B66F 17/00* (2006.01)
*G05D 1/00* (2006.01)
*G05D 1/02* (2020.01)
*B66F 9/075* (2006.01)
*B60R 21/0132* (2006.01)
*B60R 21/00* (2006.01)

(52) U.S. Cl.
CPC ......... *B66F 17/003* (2013.01); *G05D 1/0055* (2013.01); *G05D 1/024* (2013.01); *B60R 2021/0079* (2013.01); *B60R 2021/01013* (2013.01); *G05D 2201/0216* (2013.01)

(58) Field of Classification Search
CPC ........... G05D 1/024; G05D 2201/0216; G05D 1/0055; B62D 15/0265; B60R 21/0132; B60R 2021/01013; B60R 2021/0079
See application file for complete search history.

(56) References Cited

U.S. PATENT DOCUMENTS

| | | |
|---|---|---|
| 4,464,659 A | 8/1984 | Bergqvist |
| 4,733,740 A | 3/1988 | Bigowsky et al. |
| 5,107,946 A | 4/1992 | Kamimura et al. |
| 5,111,401 A | 5/1992 | Everett, Jr. et al. |
| 5,545,960 A | 8/1996 | Ishikawa |
| 5,570,285 A | 10/1996 | Asaka et al. |
| 5,602,425 A | 2/1997 | Wilhelmi et al. |
| 5,684,696 A | 11/1997 | Rao et al. |
| 5,796,354 A | 8/1998 | Cartabiano et al. |
| 5,913,919 A | 6/1999 | Bauer et al. |
| 5,938,710 A | 8/1999 | Lanza et al. |
| 5,939,986 A | 8/1999 | Schiffbauer et al. |
| 5,976,354 A | 11/1999 | Powers et al. |
| 6,038,501 A | 3/2000 | Kawakami |
| 6,173,215 B1 | 1/2001 | Sarangapani |
| 6,338,013 B1 | 1/2002 | Ruffner |
| 6,481,525 B1 | 11/2002 | Bloch et al. |
| 6,564,906 B1 | 5/2003 | Haack et al. |
| 6,595,306 B2 | 7/2003 | Trego et al. |
| 6,681,638 B2 | 1/2004 | Kazerooni et al. |
| 6,694,233 B1 | 2/2004 | Duff et al. |
| 6,784,800 B2 | 8/2004 | Orzechowski |
| 6,883,625 B2 | 4/2005 | Trego et al. |
| 6,938,720 B2 | 9/2005 | Menjak et al. |
| 6,950,035 B2 | 9/2005 | Tanaka et al. |
| 7,017,689 B2 | 3/2006 | Gilliland et al. |
| 7,124,027 B1 | 10/2006 | Ernst, Jr. et al. |
| 7,211,980 B1 | 5/2007 | Bruemmer et al. |
| 7,259,662 B2 | 8/2007 | Lewis |
| 7,430,455 B2 | 9/2008 | Casey et al. |
| 7,860,653 B2 | 12/2010 | Joe et al. |
| 7,931,431 B2 | 4/2011 | Benedict et al. |
| 8,020,657 B2 | 9/2011 | Allard et al. |
| 8,072,309 B2 | 12/2011 | Kraimer et al. |
| 8,193,903 B2 | 6/2012 | Kraimer et al. |
| 8,195,366 B2 | 6/2012 | McCabe et al. |
| 8,392,065 B2 | 3/2013 | Tolstedt et al. |
| 8,452,464 B2 | 5/2013 | Castaneda et al. |
| 8,577,551 B2 | 11/2013 | Siefring et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,970,363 B2 | 3/2015 | Kraimer et al. |
| 9,002,581 B2 | 4/2015 | Castaneda et al. |
| 9,082,293 B2 | 7/2015 | Wellman et al. |
| 9,122,276 B2 | 9/2015 | Kraimer et al. |
| 9,207,673 B2 | 12/2015 | Pulskamp et al. |
| 9,493,184 B2 | 11/2016 | Castaneda et al. |
| 9,522,817 B2 | 12/2016 | Castaneda et al. |
| 9,645,968 B2 | 5/2017 | Elston et al. |
| 9,651,930 B2 | 5/2017 | Nakatani et al. |
| 9,908,527 B2 | 3/2018 | Elston et al. |
| 10,179,723 B2 | 1/2019 | Kraimer et al. |
| 2002/0035331 A1 | 3/2002 | Brockway et al. |
| 2002/0163495 A1 | 11/2002 | Doynov |
| 2002/0178830 A1 | 12/2002 | Kazerooni et al. |
| 2005/0017858 A1 | 1/2005 | Gross |
| 2005/0052412 A1 | 3/2005 | McRae et al. |
| 2005/0247508 A1 | 11/2005 | Gilliland et al. |
| 2006/0125806 A1 | 6/2006 | Voyles et al. |
| 2006/0180381 A1* | 8/2006 | Sonderegger ......... B66F 9/0655 180/282 |
| 2006/0229774 A1 | 10/2006 | Park et al. |
| 2006/0238156 A1 | 10/2006 | Kim |
| 2006/0250255 A1 | 11/2006 | Flanagan |
| 2006/0276958 A1 | 12/2006 | Crumbaugh |
| 2007/0112461 A1 | 5/2007 | Zini et al. |
| 2007/0193798 A1 | 8/2007 | Allard et al. |
| 2008/0071429 A1 | 3/2008 | Kraimer et al. |
| 2008/0129445 A1 | 6/2008 | Kraimer et al. |
| 2009/0032560 A1 | 2/2009 | Strandberg et al. |
| 2009/0076664 A1 | 3/2009 | McCabe et al. |
| 2010/0014555 A1 | 1/2010 | Twerdochlib |
| 2010/0063680 A1 | 3/2010 | Tolstedt et al. |
| 2010/0106344 A1 | 4/2010 | Edwards et al. |
| 2010/0114405 A1* | 5/2010 | Elston .................. B66F 9/0755 701/2 |
| 2010/0157736 A1 | 6/2010 | Riordan et al. |
| 2015/0057843 A1 | 2/2015 | Kraimer et al. |
| 2016/0223655 A1* | 8/2016 | Weiss .................... G01S 7/4817 |
| 2017/0294128 A1* | 10/2017 | Lai ......................... G08G 1/167 |
| 2017/0345313 A1* | 11/2017 | Kazemian ............. G08G 1/167 |
| 2018/0004210 A1* | 1/2018 | Iagnemma ........... G05D 1/0212 |
| 2018/0081357 A1* | 3/2018 | Datta Gupta ........ G05D 1/0055 |
| 2018/0105033 A1 | 4/2018 | Schnapp et al. |
| 2018/0105215 A1 | 4/2018 | Schnapp et al. |
| 2018/0208258 A1 | 7/2018 | Lynn et al. |

FOREIGN PATENT DOCUMENTS

| | | |
|---|---|---|
| EP | 1560143 A2 | 8/2005 |
| EP | 2 678 748 | 1/2014 |
| GB | 1 548 307 A | 7/1979 |
| GB | 1548307 | 7/1979 |
| JP | H07138000 A | 5/1995 |
| JP | 2002104800 A | 4/2002 |
| WO | 8702484 A1 | 4/1987 |
| WO | 02054215 A1 | 7/2002 |
| WO | 2012/139575 A1 | 10/2012 |
| WO | 2012139575 A1 | 10/2012 |
| WO | 2018075013 A1 | 4/2018 |

OTHER PUBLICATIONS

Carelli, et al., Corridor Navigation and Wall-Following Stable Control for Sonar-Based Mobile Robots, Robotics and Autonomous Systems, 2003, 45(3-4):235-247.

Duff, et al., Automation of an Underground Mining Vehicle Using Reactive Navigation and Opportunistic Localization, In Proceedings 2003 IEEE/RSJ International Conference on Intelligent Robots and Systems (IROS 2003)(Cat. No. 03CH37453), vol. 4, pp. 3775-3780.

Duff, et al., Wall Following with Constrained Active Contours, Field and Service Robotics, STAR 24, 2006, pp. 51-60.

Dunbabin, et al., Autonomous Excavation Using a Rope Shovel, Journal of Field Robotics, 2006, 23(6-7):379-394.

Durrant-Whyte, et al., Field and Service Applications—An Autonomous Straddle Carrier for Movement of Shipping Containers-From Research to Operational Autonomous Systems, IEEE Robotics & Automation Magazine, 2007, pp. 14-23.

Gaertner, et al., A Modular Control Station for Semiautonomous Mobile Systems, In Proceedings of the Intelligent Vehicles' 94 Symposium, IEEE, 1994, pp. 405-410.

Garibotto, et al., Industrial Exploitation of Computer Vision in Logistic Automation: Autonomous Control of an Intelligent Forklift Truck, In Proceedings of the 1998 IEEE International Conference on Robotics and Automation, pp. 1459-1464.

(56) References Cited

OTHER PUBLICATIONS

Garibotto, et al., Computer Vision Control of an Intelligent Forklift Truck, In Proceedings of Conference on Intelligent Transportation Systems, IEEE, 1997, pp. 589-594.
Graefe, et al., Robot Navigation Without Calibration, In Proceedings of 2004 IEEE/RSJ International Conference on Intelligent Robots and Systems, pp. 3779-3784.
Karlsson, et al., A Capacitive Sensor for the Detection of Humans in a Robot Cell, In 1993 IEEE Instrumentation and Measurement Technology Conference, pp. 164-166.
Kelly, et al., An Infrastructure-Free Automated Guided Vehicle Based on Computer Vision—An Effort to Make an Industrial Robot Vehicle that Can Operate without Supporting Infrastructure, IEEE Robotics & Automation Magazine, 2007, pp. 24-34.
Kochan, Robotic Production Assistants for Working Alongside the Human Operator, Assembly Automation, 2002, 22 (1):26-28.
Kontz, et al., Position/Rate Haptic Control of a Hydraulic Forklift, In ASME 2003 International Mechanical Engineering Congress and Exposition, pp. 801-808.
Lang, Evaluation of an Intelligent Collision Warning System for Forklift Truck Drivers in Industry, In International Conference on Digital Human Modeling and Applications in Health, Safety, Ergonomics and Risk Management, 2018, pp. 610-622.
Larsson, et al., Laser-Based Corridor Detection for Reactive Navigation, Industrial Robot: An International Journal, 2008, 35(1):69-79.
Lecking, et al., Variable Pallet Pick-Up for Automatic Guided Vehicles in Industrial Environments, In 2006 IEEE Conference on Emerging Technologies and Factory Automation, pp. 1169-1174.
Mehta, Robo 3.1 An Autonomous Wall Following Robot, May 1, 2008, 34 pages.
Meng, et al., Wall-Following by an Autonomously Guided Vehicle (AGV) Using a New Fuzzy-I (Integration) Controller, Robotica, 1999, 17(1):79-86.
Mitsou, et al., Visuo-Haptic Interface for Teleoperation of Mobile Robot Exploration Tasks, In the 15th IEEE International Symposium on Robot and Human Interactive Communication, 2006, pp. 157-163.
Mora, et al., Factory Management and Transport Automation, In 2003 IEEE Conference on Emerging Technologies and Factory Automation Proceedings, pp. 508-515.
Pacchierotti, et al., Evaluation of Passing Distance for Social Robots, In the 15th IEEE International Symposium on Robot and Human Interactive Communication, 2006, pp. 315-320.
Walter, et al., A Situationally Aware Voice-commandable Robotic Forklift Working Alongside People in Unstructured Outdoor Environments, Journal of Field Robotics, accepted 2014, 32(4):590-628.
Tsui, et al., Soft-Computing-Based Embedded Design of an Intelligent Wall/Lane-Following Vehicle, IEEE/ASME Transactions on Mechatronics, 2008, 13(1):125-135.
Raymond, Wire Guidance, Maintenance Manual, Sep. 1, 1995, 53 pages.
Roberts, et al., Reactive Navigation and Opportunistic Localization for Autonomous Underground Mining Vehicles, Information Sciences, accepted 2001, 145(1-2):127-146.
Saleh, et al., Soft Computing Techniques in Intelligent Wall Following Control for a Car-Like Mobile Robot, in 2009 3rd International Conference on Signals, Circuits and Systems, pp. 1-6, IEEE, 2009.
Scheidig, et al., Generating Persons Movement Trajectories on a Mobile Robot, In the 15th IEEE International Symposium on Robot and Human Interactive Communication, 2006, pp. 747-752.
Seraji, et al., Behavior-Based Robot Navigation on Challenging Terrain: A Fuzzy Logic Approach, IEEE Transactions on Robotics and Automation, 2002, 18(3):308-321.
Shackleford, et al., Performance Evaluation of Human Detection Systems for Robot Safety, Journal of Intelligent & Robotic Systems, 2016, 83(1):85-103.
Sisbot, et al., Implementing a Human-Aware Robot System, In the 15th IEEE International Symposium on Robot and Human Interactive Communication, 2006, pp. 727-732.
Tews, et al., Autonomous Hot Metal Carrier, In 2007 IEEE International Conference on Robotics and Automation, pp. 1176-1182.

\* cited by examiner

FLOOR CONVEYOR

CROSS-REFERENCE TO RELATED APPLICATIONS

This application claims the priority benefit of EP 16179522.4 filed Jul. 14, 2016, the contents of which are hereby incorporated by reference as if set forth in its entirety.

TECHNICAL ART

The present disclosure relates to a method according to claim 1, a computer program according to claim 8, and a floor conveyor according to claim 9.

BACKGROUND ART

In general, order picking floor conveyors are commonly used for handling goods in warehouses and distribution centers. These floor conveyors typically include a load carrier, most commonly in the form of forks, and a power unit having a platform on which the operator may travel with the floor conveyor. A control handle may be used for steering by a connection to a steerable wheel. The control handle generally includes all the operational controls necessary for driving and operating the load carrier of the floor conveyor.

It is through EP2678748 that it is known that an order picker truck may maneuver by means of sensors and a controller. Several sensors may be used for detecting objects located in first and second zones outside the order picker truck. A steer correction maneuver may automatically be performed by steering the vehicle using the several sensors and the controller.

SUMMARY OF THE INVENTION

Provided is a floor conveyor that may be controlled by a remote control, such that the operator may operate the floor conveyor without using the operator controls on board. The remote control may thus be used for operation of the floor conveyor without the use of the control handle. A sensor device may be comprised on the floor conveyor for operation with the use of the remote control. For example, there may be a need for the detection of objects that are positioned in the travel path of the floor conveyor and to implement measures to the floor conveyor to avoid such objects. In some situations, it may be beneficial that the sensor device is operational at all moments.

According to a further aspect of the disclosure there is provided a method for operation of a floor conveyor. The method for operation of a floor conveyor, provided with a sensor device, comprises the steps of: providing a predetermined detection zone outside at least a section of the circumference of the floor conveyor for detection of objects positioned inside the predetermined detection zone by the sensor device, wherein the predetermined detection zone may be arranged to end at a first predetermined distance from a predetermined object, extending the predetermined detection zone with a second predetermined distance within which the predetermined object may be expected to be positioned, and implementing security measures on the floor conveyor, if the predetermined object is not detected within the extended predetermined detection zone, otherwise allow continued operation of the floor conveyor.

The method allows for a very convenient way of testing the function of the sensor device.

According to a further aspect of the disclosure there is proposed a method according to the above, wherein the predetermined object may be on the surface that the floor conveyor may be supported.

It may be beneficial in some situations to use the surface on which the floor conveyor may be operating to test the sensor device. This gives a precise and expected object to measure on.

According to a further aspect of the disclosure there is proposed a method according to the above, wherein the security measures comprise complete shutdown of the floor conveyor. For highest security, a complete shutdown of the floor conveyor may be beneficial.

According to a further aspect of the disclosure there is proposed a method according to the above, wherein the security measures involve a shutdown of all functions of the floor conveyor that require detection of foreign objects, inside a predetermined zone outside at least a section of the circumference of the floor conveyor, for their operation.

By applying security measures that still allow the manual operation of the floor conveyor without use of the sensor device, the operator may still perform his assignments even if the floor conveyor cannot detect foreign objects. For example, the operator can maneuver the floor conveyor on board with normal operator controls.

According to a further aspect of the disclosure there is proposed a method according to the above, wherein the second predetermined distance may be longer than the first predetermined distance, advantageously the second distance may be no longer than 1.5 times than the first predetermined distance.

By making the second predetermined distance longer than the first predetermined distance, there may be safeguarding that the predetermined object may be detected in the right spot.

According to a further aspect of the disclosure there is proposed a method of the above wherein the sensor device may be the sole sensor device on board the floor conveyor that may detect objects inside a predetermined zone outside at least a section of the circumference of the floor conveyor, and advantageously the sole sensor device may be able to detect objects outside the circumference of the floor conveyor. According to a further aspect there is proposed a method of the above wherein the zone may be provided as a plane.

A plane may be beneficial as it simplifies evaluation of detection data as it may be reduced in amount compared with a volume. It may also be easy to set up and provide for that only a sole sensor device may be easier to implement.

The present disclosure also relates to computer executable software that, when stored on a control unit of a floor conveyor, may be able to execute the method according to the above.

By implementing the method into a control unit of the floor conveyor, it may achieve automatic control of the method. The method may for example be performed at predetermined intervals without interaction of any operator.

The present disclosure also relates to a floor conveyor comprising a sensor device for detecting objects inside a predetermined zone outside at least a section of the circumference of the floor conveyor and a sensor control unit, wherein the sensor device may be arranged to be able to provide the sensor control unit with sensor data, wherein the sensor control unit may be arranged to test the sensor device by implementing the method according to the above, advantageously by means of a computer software according to the above.

The floor conveyor comprising the sensor device may be able to detect objects outside the floor conveyor. This allows for operation of the floor conveyor more or less autonomously with a high security. This security may be further augmented by the method of testing the sensor device.

The present disclosure according to a further aspect of the disclosure relates to a floor conveyor according to the above, wherein the sensor device may be mounted at an angle α with regard to the horizontal plane.

By mounting the sensor device at an angle to the horizontal plane, a convenient way of monitoring a larger volume and area may be achieved. The use of only one sole sensor may make it possible to monitor essentially the complete front of the floor conveyor opposite a load carrier of it.

The disclosure according to a further aspect of the disclosure relates to a floor conveyor according to the above, wherein the sensor device may be mounted at a predetermined distance from the surface on which the floor conveyor is supported, wherein this distance may be sufficient for the sensor device to detect objects on a first side, a section of a second side, and a section of a third side of the floor conveyor, wherein the first side may be positioned opposite a load carrier.

The predetermined distance may allow for the sensor to detect at a further range than if the detecting device were mounted adjacent the surface on which the floor conveyor is supported.

The disclosure according to a further aspect of the disclosure relates to a floor conveyor according to the above, wherein the sensor device may be able to detect objects projecting into a predetermined zone positioned outside at least a section of the circumference of the floor conveyor for detection of objects positioned inside the predetermined detection zone by the sensor device, advantageously the predetermined zone may be provided as a predetermined plane.

By having a sensor device that may detect in a zone, in particular a plane that may be extending from the sensor device, an additional area may be detected than with a beam detecting device that essentially detects objects on a line extending from the sensor. Further by detecting in a plane and not in a volume the sensor device can be installed for optimal operation.

The disclosure according to a further aspect of the disclosure relates to a floor conveyor according to the above, wherein the sensor device may be mounted in a central position on the longitudinal symmetry line of the floor conveyor.

With a central position it may be even easier to only implement a single sensor device for detecting more than one section of a side of the floor conveyor.

The disclosure according to a further aspect of the disclosure relates to a floor conveyor according to the above, wherein the sensor device may be a laser sensor.

A laser sensor may be particularly reliable and easy to configure. They are not as easily disturbed by, for example, the use of pressurized air as, for example, ultra sound detectors are prone to.

The present disclosure according to a further aspect of the disclosure relates to a floor conveyor according to the above, wherein the sensor device may be the sole sensor device on board the floor conveyor that can detect objects inside a predetermined zone outside at least a section of the circumference of the floor conveyor, advantageously the sole sensor device may be able to detect objects outside the circumference of the floor conveyor.

DETAILED DESCRIPTION

The present disclosure relates to a floor conveyor comprising a sensor device for detecting objects. The floor conveyor may be any type of floor conveyor that is operable with such a sensor device. Examples of such floor conveyors are order picker trucks, stacker trucks, pallet trucks, reach trucks, or tow tractors having a wagon or a space for material handling. The sensor device of the disclosure can detect objects that enter or are positioned within a certain distance of the floor conveyor. One exemplary usage of a floor conveyor with a sensor device according to the disclosure is an order picker truck that may be used with a remote control. In some embodiments, a sensor device may be required when using the remote control. However, the use of a remote control is not mandatory for the disclosure.

Figure 5:
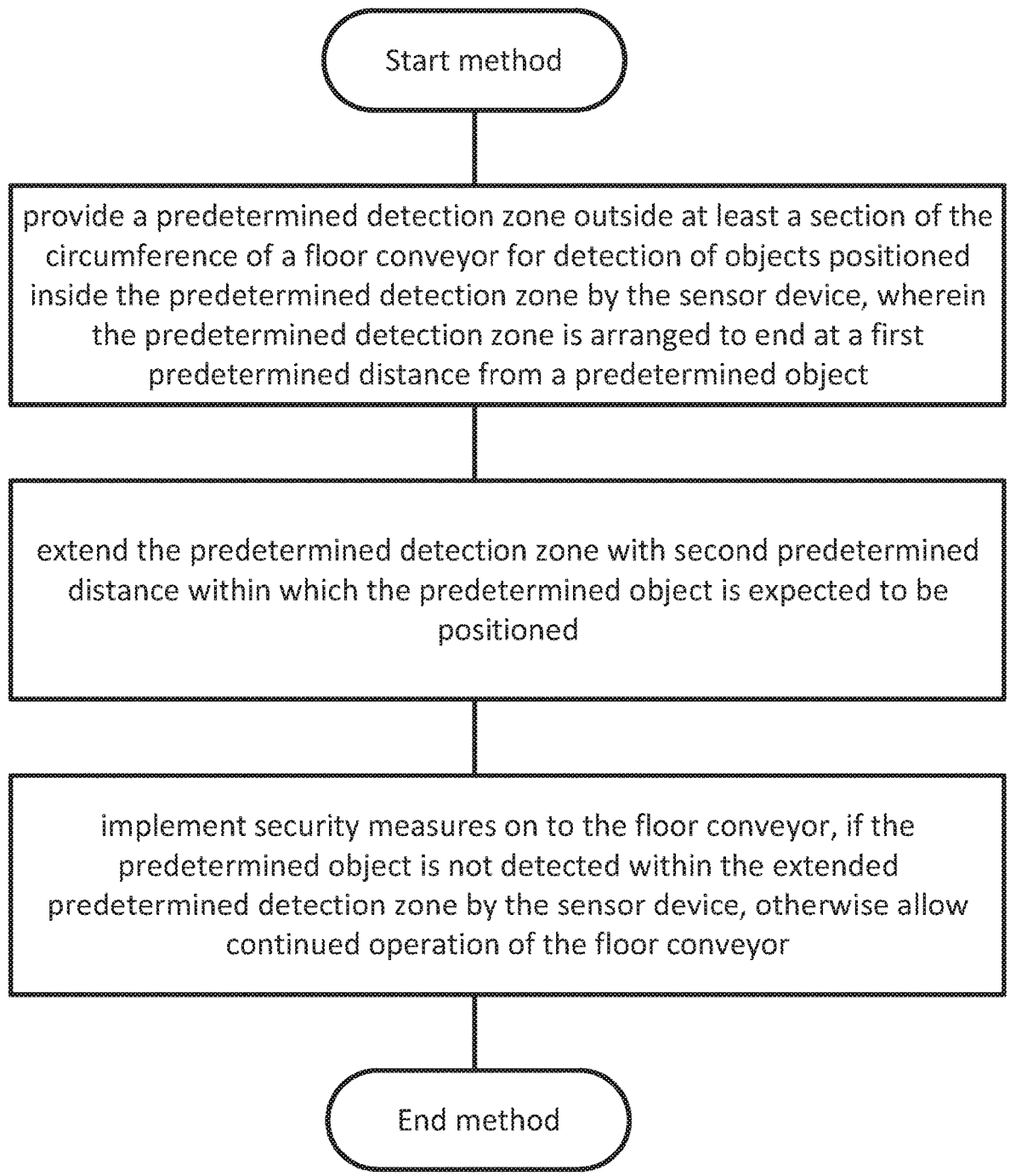
FIG. 5 shows a method according to the present disclosure.

The present disclosure relates to a method as seen in FIG. 5. The present disclosure thus relates to a method for operation of a floor conveyor, provided with a sensor device, comprising the steps of: providing a predetermined detection zone outside at least a section of the circumference of the floor conveyor for detection of objects positioned inside the predetermined detection zone by the sensor device, wherein the predetermined detection zone may be arranged to end at a first predetermined distance from a predetermined object, extending the predetermined detection zone with second predetermined distance within which the predetermined object is expected to be positioned, and implementing security measures on the floor conveyor, if the predetermined object is not detected within the extended predetermined detection zone by the sensor device, otherwise allow continued operation of the floor conveyor.

Figure 4:
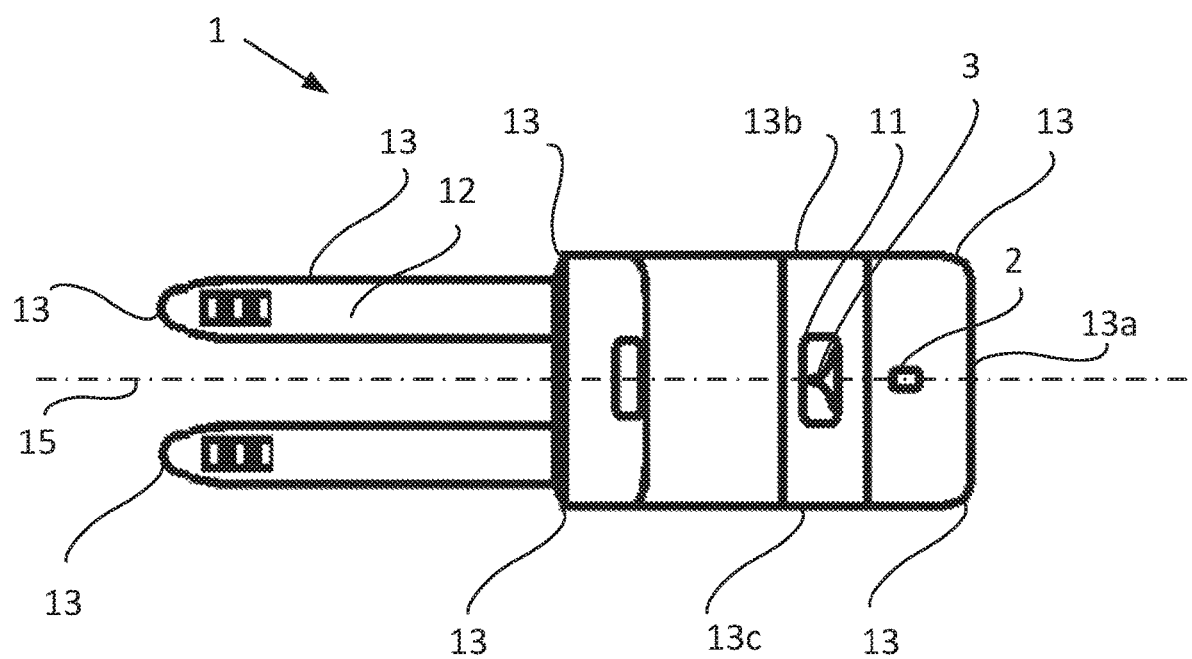
FIG. 4 shows a floor conveyor according to FIGS. 1-3, shown from above.

The detection zone may be provided by the sensor device. The aim for the detector may be to detect objects that are positioned outside the circumference of the floor conveyor. The circumference is best seen in FIG. 4 of the disclosure as number 13. That is the circumference may be construed as being the outer contour of the floor conveyor. Thus the step of providing may be setting the normal operation of the floor conveyor when in material handling operations. The predetermined zone may end at a first predetermined distance from a predetermined object. In the next step of extending, the predetermined zone may be extended. The extension may be made with a second predetermined distance. The second predetermined distance may be based on the position of an expected object. In most cases the second predetermined distance may be the same as the first predetermined distance. Thus, expected means that the method may rely on an object that should be present when performing the method. However, the second predetermined distance may be made longer than the first predetermined distance. This may avoid unnecessary fault detection of the sensor device. It should be understood that it may be important that the second predetermined distance is not too long, because if the sensor device is not in the correct position the test may indicate that no detection of the predetermined object is achieved. As an example the second predetermined distance may not be more than 1.5 times the first predetermined distance.

In some embodiments the expected object may be an object to which the distance is more or less constant over time. In some situations it may be beneficial for the predetermined object to be on the surface on which the floor conveyor is supported, e.g., the floor or the tarmac on which the floor conveyor is operating. This provides for a very repeatable and easy way of executing the method. It is of course thinkable to perform the method by using another object such as a wall or a pillar as the object. In this case the method may require that the position of the floor conveyor in relation to the object is known when the method is performed. The position may be known by positioning the floor conveyor in a marked test position, or by manually entering the position into a control unit of the floor conveyor, or by sending the position to the floor conveyor through an interface, or determining the position by a positioning system in the area where the floor conveyor is operating.

When the predetermined object is not detected by the extending step, security measures may be applied according to the method. One security measure possible may be to completely shut down the floor conveyor. However, it may also be possible to limit the functions of the floor conveyor. For example, it may be beneficial that the functions of the floor conveyor that are dependent on the function of the sensor device be shut down. Functions that are dependent on the sensor device may be, for example, allowable speeds of travel above a certain level, independent travel of the floor conveyor without the operator using the normal controls, e.g., using a remote control, of the floor conveyor, automatic travel of the floor conveyor following an object at one side, e.g., a storage shelf, etc.

The present disclosure also relates to a computer executable software that when executed on a floor conveyor, the disclosure performs the method as discussed above. By implementing the method as a software the method can be made more independent from interaction of an operator and thus the testing of the sensor device can be made more reliable. The method can be performed at predetermined intervals without interaction of any operator etc. For example, in some situations it may be beneficial that the method is executed at start-up of the floor conveyor. This may be implemented when executing the method by the control unit of the floor conveyor.

Figure 1:
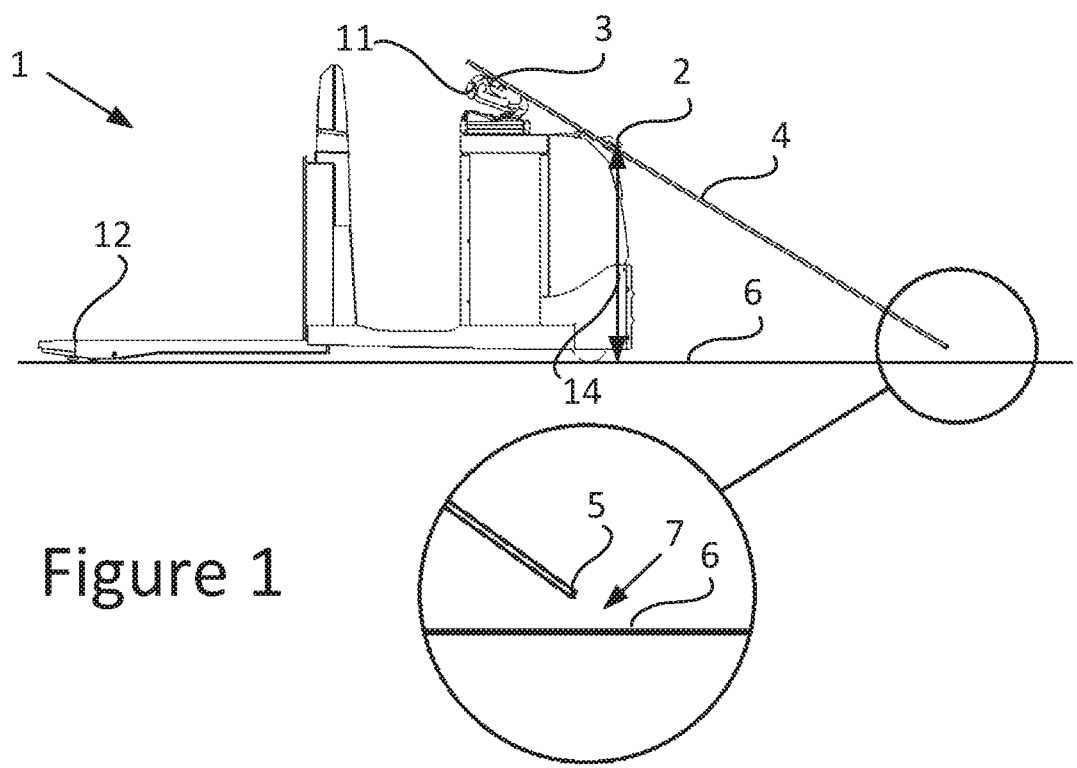
FIG. 1 shows a floor conveyor according to the present disclosure.
Figure 3:
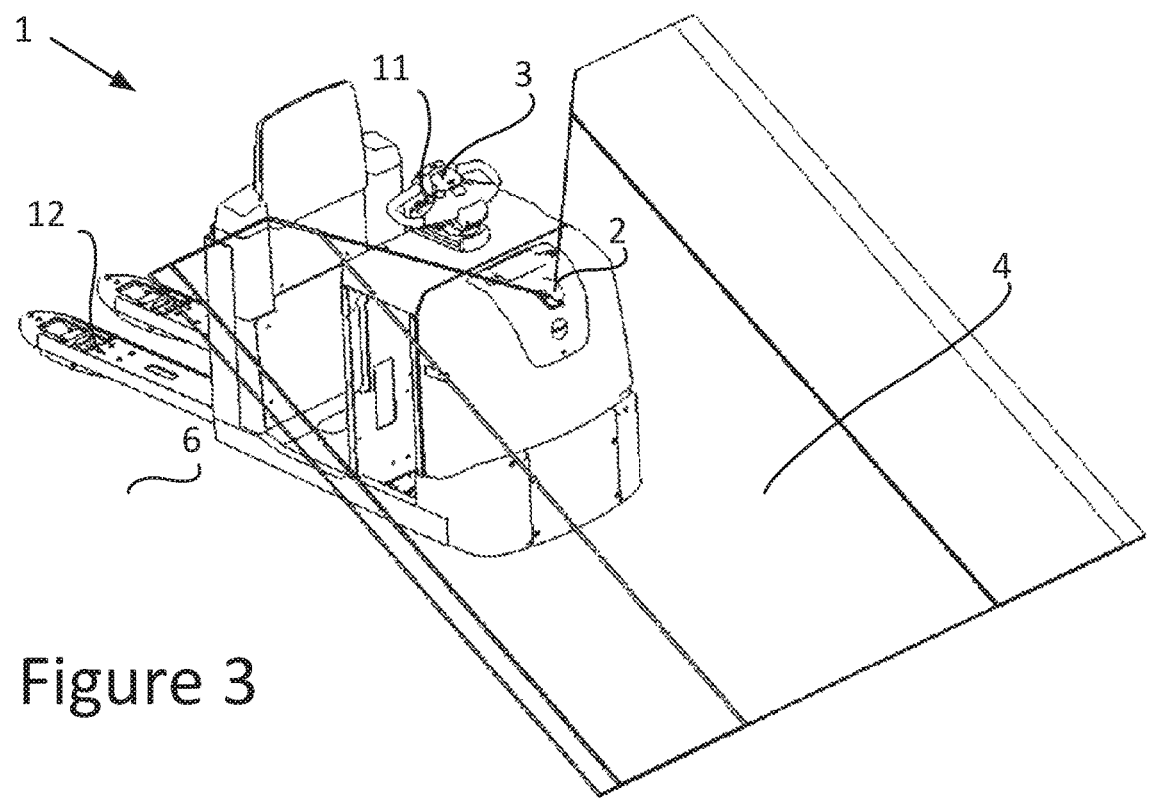
FIG. 3 shows a floor conveyor according to FIGS. 1 and 2, shown from another angle.

In FIG. 1, there is disclosed the floor conveyor 1 with the sensor device 2. The floor conveyor 1 further comprises the control unit 3 that may be able to control the sensor device 2. The sensor device 2 may detect objects within the predetermined detection zone 4. The zone 4 may be best viewed in FIG. 3, but the zone 4 can also be seen from the side in FIG. 1. The sensor device 2 may be mounted at an angle α to the horizontal plane. The range of the detection zone 4 may be in the lower part ended at an end side 5. Side 5 may be positioned above the surface 6 on which the floor conveyor 1 is supported, more specifically the side 5. The side 5 thus leaves a gap 7 to the surface 6. In some embodiments, this may be made in practice by limiting the time slot for which measurement is made of the sent out sensor waves from the sensor device 2. The reason for providing the first predetermined distance point or side 5 may be for the reason that otherwise a constant signal may be generated from the surface 6, when operating the floor conveyor 1. For the present disclosure it may not be important how the shape of the zone is constituted. The shape of the zone 4 in FIG. 3 is only given as an example. The zone 4 may be advantageously constituted as a plane.

Figure 2:
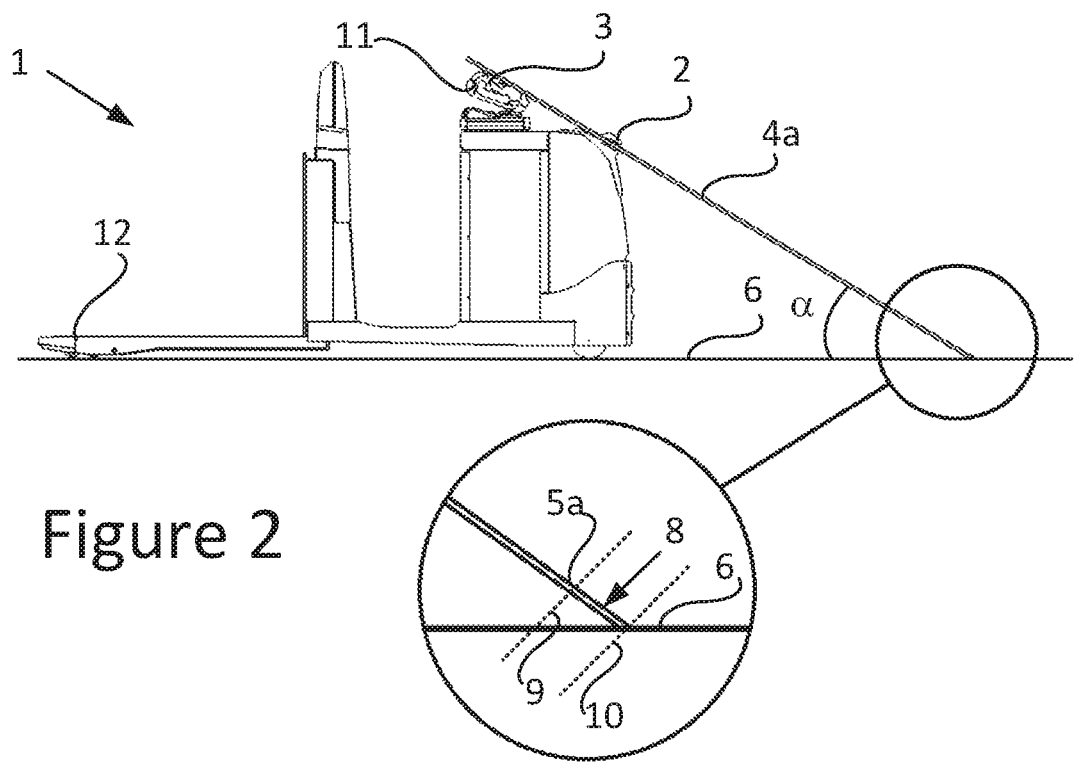
FIG. 2 shows a floor conveyor according to FIG. 1, shown with an extended plane.

FIG. 2 shows the core part of the disclosure. The zone 4 of FIG. 1 may be extended during the test of the sensor device 2, to an extended zone 4a as seen in FIG. 2. If the sensor device 2 is functioning according to predetermined requirements, a signal will be obtained from the surface 6. The sensor device 2 may then send a signal to the control unit 3 that can acknowledge continued operation without limitations. The gap 7 may be covered by the extended zone 4a from the line 9 to the line 10 essentially ending on the surface 6. In some embodiments it may be beneficial for the distance of extension to be a little bit longer than the distance between line 9 and 10, to safeguard that an expected object is within the extend zone 4a. If the sensor device is not operating correctly, or pointing in the wrong direction, no signal will be detected by the sensor device 2. Then the control unit 3 will not get detection data and may not take measures on this, as will be further explained below.

The angle α may be adjusted for the use of the floor conveyor. If a smaller angle is used the detection zone 4 will have a longer range on side 13a, FIG. 4, of the floor conveyor. If a larger angle α is used, a shorter detection zone 4 may be achieved. By the angle α it provides for that only one sole sensor may be used for detection of objects supported on the surface 6 despite that the sensor device may be positioned higher up on the floor conveyor 1. In some embodiments of the floor conveyor 1, other than the sensor device 2, the floor conveyor 1 has no further sensor device for detecting objects. In these embodiments, the sensor device 2 may then be the sole sensor device for this purpose on the floor conveyor 1.

The sensor device 2 may be mounted at a predetermined distance 14, shown in FIG. 1, from the surface 6. The distance 14 may be advantageously at the upper portion of the housing of the floor conveyor 1. It should be understood that lower positions may be possible, but it may be desired to keep the sensor device 2 away from the surface 6. It may also be beneficial to have the sensor device 2 higher in order to be able to detect objects protruding in space and not necessarily being supported on the surface 6.

In some situations it may be beneficial to have a sensor device that can detect objects positioned or/projecting within a plane 4. The plane 4 allows for a good coverage of the zone to be detected. Existing detectors that essentially lock in a more restricted beam in one direction may be more limited and may not be as efficient as when applying a plane, such as plane 4. Further, by detecting in a plane, such as plane 4, and not in a volume, the sensor device can be installed for optimal operation, i.e., the angle of the plane 4 may be used for extension and reduction of the desired detection zone in longitudinal direction of the plane 4. The extended zone 4a may also be a plane.

In some embodiments the position of the sensor device 2 may be in a central position on the longitudinal symmetry line 15 of the floor conveyor 1. By mounting in this position, it may be simpler to achieve a predetermined detection zone 4 that can detect objects on sides 13a, 13b, and 13c of the floor conveyor 1, FIG. 4.

A laser sensor 2 may be advantageously used as the sensor device 2. The laser sensor may be applied to monitor a plane. Any laser sensor applicable to this is usable. In some situations it may be beneficial that the laser sensor 2 can monitor more than 180 degrees in front of it, advantageously more than 240 degrees, or even more advantageously more than 300 degrees. This allows for detecting objects on at least sections of side 13a, 13b, and 13c. In particular when the sensor device 2 is mounted a bit retracted from the most protruding point of any side to be monitored, such as side 13a as seen in FIG. 1.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of the embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

Although the above discussion discloses various exemplary embodiments, it should be apparent that those skilled in the art can make various modifications that will achieve some of the disclosed advantages without departing from the true scope of the disclosure.

The invention claimed is:

1. A method for operation of a floor conveyor, the floor conveyor including a sensor device, the method comprising:
   via the sensor device, providing a detection zone outside at least a section of a circumference of the floor conveyor, wherein the detection zone is arranged to end at a first predetermined distance,
   extending the detection zone to end the detection zone at a second predetermined distance,
   via a control unit in communication with the sensor device, implementing a security measure on the floor conveyor if an object is not detected within the detection zone when the detection zone is extended to the second predetermined distance.

2. The method according to claim 1, wherein the security measure includes a shut down of all functions of the floor conveyor that require detection of objects inside the detection zone.

3. The method according to claim 1, wherein the sensor device is the sole sensor device on board the floor conveyor that detects objects inside the detection zone and outside at least the section of the circumference of the floor conveyor.

4. The method of claim 1, wherein extending the detection zone to end the detection zone at the second predetermined distance comprises extending the detection zone toward a surface upon which the floor conveyer is supported.

5. The method of claim 4, wherein implementing the security measure on the floor conveyer if the object is not detected within the detection zone when the detection zone is extended to the second predetermined distance comprises implementing the security measure on the floor conveyer if the surface is not detected within the detection zone when the detection zone is extended to the second predetermined distance.

6. The method of claim 1, wherein extending the detection zone to end the detection zone at the second predetermined distance comprises extending the detection zone away from a load carrier of the floor conveyer.

7. The method of claim 1, wherein providing a detection zone comprises providing the detection zone oriented along a plane, the plane oriented at an angle relative to a horizontal plane.

8. A floor conveyor comprising:
   a sensor device configured to generate a detection zone and to extend the detection zone from a first predetermined distance from the sensor device to a second predetermined distance from the sensor device; and
   a control unit in communication with the sensor device, the control unit to implement a security measure on the floor conveyor if an object is not detected within the detection zone when the detection zone extends to the second predetermined distance from the sensor device.

9. The floor conveyor of claim 8, wherein the detection zone is to be generated along a plane, the plane to be oriented at an angle relative to a horizontal plane.

10. The floor conveyor of claim 9, wherein the plane is to intersect a surface on which the floor conveyer is supported.

11. The floor conveyor of claim 10, wherein the sensor device is configured to detect the surface when the sensor device extends the detection zone from the first predetermined distance to the second predetermined distance.

12. The floor conveyor of claim 8, wherein the security measure includes at least one of shutting down the floor conveyor, shutting down all functions of the floor conveyor that require detection of an object inside the detection the detection zone, changing a speed of travel of the floor conveyor, or changing an automatic traveling function of the floor conveyor.

13. The floor conveyor of claim 8, wherein the sensor device is configured to extend the detection zone from the first predetermined distance from the sensor device to the second predetermined distance from the sensor device upon a start-up of the floor conveyor.

14. The floor conveyor of claim 8, wherein the sensor device is mounted on the floor conveyor such that a longitudinal line of symmetry of the floor conveyor intersects a portion of the sensor device.

15. The floor conveyor of claim 8, wherein the sensor device includes a laser.

16. A floor conveyer comprising:
   a sensor device configured to:
      generate a detection zone having a first range that is to leave a gap between the detection zone and an object; and
      extend the detection zone to have a second range in which the object is to be within the detection zone; and
   a control unit in communication with the sensor device, the control unit to implement a security measure on the floor conveyer if the object is not detected within the detection zone when the detection zone is extended to have the second range.

17. The floor conveyer of claim 16, wherein the sensor device is configured to generate the detection zone along a plane.

18. The floor conveyer of claim 16, wherein the object is a surface on which the floor conveyer is to be supported, and wherein the sensor device is configured to generate the detection zone in a direction toward the surface.

19. The floor conveyer of claim 16, wherein the security measure includes at least one of shutting down the floor conveyor, shutting down all functions of the floor conveyor that require detection of an object inside the detection the detection zone, changing a speed of travel of the floor conveyor, or changing an automatic traveling function of the floor conveyor.

20. The floor conveyor of claim 16, wherein the sensor device is configured to extend the detection zone to have the second range upon a start-up of the floor conveyor.

* * * * *